Reissued Oct. 8, 1935

Re. 19,719

UNITED STATES PATENT OFFICE 19,719

WATER SOFTENING AND WASHING

Ralph E. Hall, Mount Lebanon, Pa., assignor to Hall Laboratories, Inc., Pittsburgh, Pa., a corporation of Pennsylvania No Drawing. Original No. 1,956,515, dated April 24, 1934, Serial No. 661,787, March 20, 1933. Renewed February 26, 1934. Application for reissue March 29, 1935, Serial No. 13,767

30 Claims. (Cl. 210—23)

The present invention relates to water softening and washing, and more particularly to the softening of water by the use of an alkali-metal metaphosphate, and to washing with water which has been treated with an alkali-metal metaphosphate. This application is a continuation in part of my copending application Serial No. 629,873, filed August 22, 1932.

The natural waters, practically all of which contain some calcium and/or magnesium, can be divided roughly into two general classes, the so-called "soft" waters and the so-called "hard" waters. There is no sharp line of division between the two, and some waters lie about midway between what would be considered to be a soft water or a hard water. In general, the soft waters contain such small amounts of calcium and magnesium that they lather fairly freely upon the addition of small amounts of the ordinary fatty-acid soaps. The hard waters, on the other hand, due primarily to their higher calcium and/or magnesium contents, do not lather freely upon the addition of a small amount of soap. The calcium and magnesium exist in such waters in the form of soluble salts, usually sulphates, bicarbonates or chlorides. These salts are ionized so that the waters contain a relatively large concentration of free calcium and/or magnesium ions. When a soap is added to such hard waters the calcium or magnesium ions combine with the fatty-acid radicals of the soap to form insoluble calcium or magnesium soaps, until the free calcium and magnesium ions are reduced in concentration to their equilibrium with these soaps. Then a lather will be formed by the addition of further soap.

While the "softening" of waters is most commonly effected to render the waters better suited for washing purposes, water softening is not limited to such uses, as hard waters are softened for various other domestic and industrial purposes. Chemically speaking, the softening of a hard water consists in reducing the concentration therein of free calcium and/or magnesium ions. The degree of softening is dependent upon the extent of the diminution of the free calcium and/or magnesium ions.

There are three usual ways now in vogue for softening water. The first method is by distillation, and condensation of the steam, whereby pure water is evaporated from the impure hard water, the impurities remaining behind. This requires distillation apparatus and is relatively expensive. The second method is by the use of the so-called water-softening compounds, generally sodium carbonate (washing soda), trisodium phosphate which is sold under various trade names, lime-soda ash, sodium silicate, etc. In these processes the calcium and magnesium are converted, for the most part, into insoluble salts which are precipitated and which may be removed, although in the ordinary domestic use of water softeners the precipitate remains in the softened water. Practically all of these water-softening compounds are highly alkaline, and water softened by their use is rendered highly alkaline which is objectionable for many purposes, such, for example, as for domestic use, as the alkalinity attacks the human skin and the fibres of fabrics being washed. When the precipitated solid phase remains in the softened water, as is usual in domestic use of water-softening compounds, the soap will tend to redissolve the precipitated phase, such as the calcium carbonate or calcium phosphate, and re-precipitate the calcium as calcium soap, unless a large excess of sodium carbonate or sodium phosphate is used. It is therefore necessary, for such domestic water softening, to use a large excess of the water-softening compound with a consequent excessive alkalinity imparted to the softened water. Also, the solid phase remains in the water and may be entrapped in the fabrics being washed, rendering them harsh. The third common method of softening water now in vogue is the zeolite or base exchange method, in which the water is passed through a special softening apparatus in which the sodium of the zeolite is exchanged for the calcium and/or magnesium in the water. The zeolite process requires the use of relatively expensive apparatus which requires attention in order to periodically regenerate the zeolite.

I have found that waters containing calcium and/or magnesium may be effectively softened by the use of an alkali-metal metaphosphate, such as sodium metaphosphate, potassium metaphosphate, lithium metaphosphate, or ammonium metaphosphate, preferably sodium metaphosphate on account of its lesser cost. For purposes of conciseness in description, my process will be described with reference to the use of sodium metaphosphate, it being understood that other alkali-metal metaphosphates may be used.

I have found that the softening thus effected can be had without objectionably increasing, or increasing at all, the alkalinity of the water. In fact, a neutral softened water can be obtained, or a softened water which is slightly acid or which is alkaline to the desired extent. Also, softening can be effected without the production of any solid-phase precipitate which would cloud the water, and a completely softened water can be obtained which is crystal clear. The process can be carried out without the use of any special equipment, the sodium metaphosphate or a solution thereof simply being added to the water. This adapts it particularly to domestic use. The domestic user can obtain a completely softened water which is crystal clear and in which the alkalinity is not increased, so that it can be used without damage to the skin or to fabrics.

When the water is to be used for washing purposes, a soap will ordinarily be added to increase its detergent and deflocculative properties and assist in peptizing greases. However, the softened water may be used for any purpose for which soft water is desired. For certain purposes the water which has been softened with an alkali-metal metaphosphate is superior to a naturally soft water or a water which has been softened by the usual water-softening methods, in that the alkali-metal metaphosphate imparts to the water certain detergent properties and also solvent properties, particularly upon calcium and magnesium soaps. Water containing the alkali-metal metaphosphate may be advantageously used for rinse water in the laundering of fabrics since, due to the solvent properties of the metaphosphate for such soaps, it dissolves calcium and magnesium soaps which may have been deposited in the fabrics in the previous washing operation.

The material which I prefer to use is the soluble sodium metaphosphate sometimes called "Graham's salt", (Textbook of Inorganic Chemistry, edited by J. Newton Friend, vol. 6, part 2, page 177, by J. B. R. Prideaux, Philadelphia, 1934; Gmelin, Handbuch der Anorganischen Chemie, vol. 21, page 922, 8th Edition, Berlin, 1928); or "Graham's metaphosphate" (A Dictionary of Chemistry, by Henry Watts, vol. 4, page 578, New York, 1873; A Treatise on Chemistry, by Roscoe & Schorlemmer, vol. 2, Part 1, page 283, New York, 1923), and which may have mixed with it a small amount of sodium pyrophosphate to counteract the slight acidity of the sodium metaphosphate. Graham's metaphosphate or salt is believed to consist principally of sodium hexametaphosphate. The sodium hexametaphosphate is assumed to be a complex of the general formula $Na_2(Na_4P_6O_{18})$, although some authorities believe that salts of the formula $Na_5(NaP_6O_{18})$ and $Na_4(Na_2P_6O_{18})$ may also be present.

Sodium hexametaphosphate in readily soluble form may be prepared by strongly heating monosodium dihydrogen orthophosphate, and rapidly cooling the molten mass. The quick cooling is apparently essential to the formation of a readily soluble salt. Upon slower cooling of the molten mass there is a tendency to form other sodium metaphosphates, such as sodium trimetaphosphate which is soluble, but which is not effective in repressing the precipitation of calcium and magnesium, and sodium monometaphosphate which is difficultly soluble. I cool the mass sufficiently rapidly so that the sodium metaphosphate is obtained principally in the form generally accepted as sodium hexametaphosphate. The metaphosphate employed should be readily water soluble and capable of effectively sequestering calcium in a but slightly ionized condition.

The sodium hexametaphosphate is slightly acid, and I therefore prefer to form it so that it will contain a small amount of sodium pyrophosphate, which is slightly alkaline, in order to obtain a water softener which is substantially neutral. The addition of a small amount of sodium carbonate to the monosodium dihydrogen orthophosphate at the time of fusion, results in the presence of an equivalent amount of sodium pyrophosphate in the fused product, and the amount of sodium carbonate used will determine the neutrality or slight alkalinity of the fused product. Provision for neutralizing the acidity of the sodium metaphosphate when it is dissolved may also be made, if desired, by mixing with it a small amount of caustic soda, sodium carbonate, or sesquicarbonate, borax, trisodium phosphate, sodium metasilicate, etc. The amounts of such neutralizing agents are relatively small and my water softener consists principally of sodium metaphosphate, and therefore when I speak of sodium metaphosphate I mean to include not only the pure sodium metaphosphate, but also sodium metaphosphate containing small amounts of acid-neutralizing reagents and perhaps other impurities.

The action of the sodium metaphosphate is different from that of the usual water-softening compounds. No permanent precipitate of calcium or magnesium is formed. I believe that the sodium metaphosphate softens the water through removing the free calcium and magnesium ions by bringing them into a soluble slightly ionized compound or radical. The following experimental evidence points to this explanation of the action of the sodium metaphosphate.

If the proper amount of sodium metaphosphate is added to a hard calcium-bicarbonate water, and the water is then boiled to drive off the carbon dioxide, no precipitate of calcium carbonate is formed. This indicates that the calcium is combined in some slightly ionized compound or radical, whereby the calcium-ion concentration is reduced below below that corresponding to the saturation equilibrium of calcium carbonate. It is possible to add sodium metaphosphate to a mixture of water and solid calcium carbonate and to dissolve the calcium carbonate, forming a clear solution. Sodium metaphosphate may be added to a mixture of water and tricalcic phosphate and the same phenomenon will occur, demonstrating the extremely low ionization of the soluble compound or radical in which the calcium is sequestered or locked up, so to speak.

Further evidence of the almost complete removal of the free calcium and magnesium ions by sodium metaphosphate is furnished by the addition of sodium metaphosphate to a hard water to which soap has been added, forming the well-known scum of calcium and/or magnesium soap. If a sodium metaphosphate is added to such water in appropriate amount it will cause complete dissolution of the calcium and/or magnesium soap, freeing the fatty-acid ions from the calcium and/or magnesium and thus rendering them available for detergent action. This demonstrates that the ionization of the soluble compound formed by the sodium metaphosphate with the calcium and/or magnesium is such that the calcium-ion and/or magnesium ion concentration resulting therefrom is less than that from the saturated solution of calcium and/or magnesium oleate or other calcium and/or magnesium salt of the fatty acids commonly used in soaps.

In softening water for washing purposes, the sodium metaphosphate is added in an amount sufficient to effect a satisfactory degree of softening of the water against soap. The simplest way of determining the amount of sodium metaphophate required for any particular water is to simply keep on adding the sodium metaphosphate until the water is softened to the degree effective for the purpose in hand. The usual way of determining softness is by the familiar soap test. If the water gives a permanent lather upon the addition of a small amount of soap, it is considered to be completely softened. However, for many purposes complete softening of the water is not required, as washing may be carried out with an incompletely softened water. In fact, in the domestic use of water-softening compounds, the housewife often does not add enough of the compound to effect complete softening, but does add enough so that a lather is produced upon the addition of soap, although the lather may not be permanent. Therefore, while it is preferred to add sufficient sodium metaphosphate to effect complete softening, smaller amounts of sodium metaphosphate may be used which will not completely soften the water but which will soften the water enough to satisfy the user. Therefore, when I speak of effectively suppressing the calcium-ion concentration, I do not means that complete softening of the water must be attained, as partial softening may be sufficient to suppress the calcium-ion concentration effectively enough for the purpose desired by the user.

The domestic user will use the sodium metaphosphate exactly as he or she uses washing soda or trisodium phosphate, namely, adding the amount which experience has shown will give proper lathering qualities to the water. The commercial user, such as laundries or textile establishments, will add measured amounts of the sodium metaphosphate to measured amounts of water until the standard soap test indicates complete softening of the water. This will tell the user the minimum amount of sodium metaphosphate required to soften his particular hard water.

As a specific example to indicate generally the amount of the sodium metaphosphate required for softening a typical hard water for washing purposes, I may cite the case of the Pittsburgh city water which, when tested, contained approximately 30 parts per million of calcium and approximately 4 parts per million of magnesium. This water was completely softened by the addition per 1000 gallons of 3 pounds of sodium hexametaphosphate containing about 10% sodium pyrophosphate to render it substantially neutral.

One of the most important applications of my process of water-softening is that of softening the water against soap, on account of the extensive use of hard waters for domestic and industrial purposes. The addition of the sodium metaphosphate not only completely softens the water against soap so as to completely prevent the formation of insoluble calcium and magnesium soaps, but effects this softening without the formation of any solid precipitates of calcium and magnesium and without rendering the water alkaline, as is the case with sodium carbonate, trisodium phosphate, and sodium silicate, which are commonly used as water softening compounds. The advantages of obtaining a perfectly softened crystal clear neutral water are too obvious to require extended discussion. It may be mentioned, however, that, as shown by the ability of the solution of sodium metaphosphate to actually dissolve calcium carbonate, tricalcic phosphate and calcium silicate, the water is actually softened to a greater degree than that obtainable by the use of sodium carbonate, trisodium phosphate or sodium silicate. The water which has been softened in accordance with my process can be used advantageously for any washing purposes, such as for washing fabrics, hair, the body, dishes, walls, painted or varnished surfaces, etc., particularly since complete softening is effected without any undesirable increase in alkalinity.

Another important application is in the rinsing of clothes in laundering. The water softened in accordance with my process not only rinses out the soapy water carried over from the washing tub, but also dissolves calcium and/or magnesium soaps which may be carried with the clothes. If the washing of the clothes is carried out with hard water or with an incompletely softened water, a curd-like calcium and/or magnesium soap is formed which may be carried over into the rinse with the clothes. As stated above, the solution of sodium metaphosphate will dissolve such calcium and/or magnesium soap and remove it from the clothes. Therefore, as a rinse water, particularly where calcium and/or magnesium soap may be carried over with the clothes from the washing water, the water softened in accordance with my process is even more effective as a rinse than a naturally soft water.

My process of water softening, however, has other applications. For example, the trouble encountered in the canning industry in using water to cool and wash cans taken from the pressure cookers may be overcome. At the present time the cans which are taken from the pressure cookers are immersed in water to cool them. If the water is one containing considerable calcium bicarbonate, the heating of the water by the hot cans results in driving off the carbon dioxide, causing a precipitation of calcium carbonate which will be deposited and dull or "gray" the cans. This trouble may be completely overcome by adding sufficient sodium metaphosphate to the water to prevent the formation of calcium carbonate when the water is heated.

Another application of my process of water softening is in the artificial ice industry. As the ice is frozen, crystals of pure water are formed and the carbon dioxide of the water is driven off as a gas. This results in breaking down calcium bicarbonate if present in the water, resulting in cloudiness in the ice. This may be overcome by the addition of sufficient sodium metaphosphate to prevent the formation of calcium carbonate in the ice.

Another application of my waste-softening process is in the prevention and even dissolution of sludge or scale deposits in the feed-line equipment for steam boilers. As described in the United States patent of Hall and Jackson, No. 1,903,041, dated March 28, 1933, the alkalinity of water in the steam boiler may be controlled by the addition of sodium metaphosphate to the boiler water, usually by addition to the feed water as it passes through the boiler feed lines. As described by Hall and Jackson, the sodium metaphosphate is converted in the boiler into sodium orthophosphate which combines with the calcium to form a sludge of tricalcic orthophosphate in the boiler. When the sodium metaphosphate or sodium pyrophosphate, or a mixture of the two, is added to the feed water as described by Hall and Jackson, not enough of the phosphate is added to soften the water, as the amount of orthophosphate required to precipitate the calcium as calcium orthophosphate in the boiler contains a smaller amount of $P_2O_5$ than the amount of $P_2O_5$ required in the form of metaphosphate to soften the water. As a consequence, in feeding the water to the boiler as described by Hall and Jackson, because some transformation of metaphosphate or pyrophosphate to orthophosphate occurs in the feed lines, difficulties may be encountered due to the deposition of tricalcic-phosphate scale or sludge in the feed line equipment. The remedy suggested by Hall and Jackson of adding an inhibitor, such as a tannin body, is objectionable as introducing unnecessary organic matter into the boiler water.

I have found that the trouble encountered with feed line deposits may be completely overcome in most cases, by adding enough sodium metaphosphate to the feed water to completely soften the water passing through the feed line equipment. Such amount, if continuously added would be far in excess of that required for the boiler, and for that reason I add the sodium metaphosphate to the feed water intermittently. As a specific example, the sodium metaphosphate may be added to the feed water for, say, a 5 or 10 minute period during each hour of a continuous feed of feed water. This permits sufficient sodium metaphosphate to be added to the feed water during such 5 or 10 minutes to completely soften the water as against tricalcic phosphate and prevents the deposition of any tricalcic phosphate in the feed lines. Moreover, since the calcium-ion concentration of the feed water to which this excess amount of sodium metaphosphate has been added is less than that in equilibrium with solid tricalcic phosphate or calcium carbonate, the water containing the excess sodium metaphosphate will actually dissolve any phosphate or carbonate which may be deposited in the feed lines. Calcium carbonate may be deposited in the feed lines during the time when untreated water is being pumped to the boiler, but any such deposits are eliminated by their dissolution when the water which is completely softened by the sodium metaphosphate is passed through the feed line. This application of my process of water softening illustrates the completeness to which the water softening can be carried by the use of a proper amount of sodium metaphosphate since the concentration of calcium and magnesium ions is reduced to the point where the water will actually redissolve tricalcic phosphate and calcium carbonate. The water treated with the sodium metaphosphate is even more efficacious in dissolving such lime deposits than would be distilled water, since the sodium metaphosphate removes from the solution the calcium and magnesium ions coming from the feed-line deposits and thus keeps the water in an undersaturated condition with respect to the calcium phosphate or calcium carbonate deposits.

Another application of my process of water softening is in the prevention and dissolution of sludge or scale deposits in hot water distributing systems. The calcium derived from the water or by the dissolution of any solid deposits in the pipes is apparently locked up in the extremely slightly ionized compound or radical which it forms with the metaphosphate. Thus a soft and clear water is delivered at the point of use, and the deposition of scale is prevented and previously deposited scale is redissolved.

The foregoing specific description relates particularly to the suppression of calcium-ions in the hard water. The calcium is the principal precipitate-forming alkaline-earth metal in most hard waters, although it is frequently accompanied with magnesium. I therefore use the expression "alkaline-earth metals" as inclusive of magnesium as well as calcium. The sodium metaphosphate forms soluble slightly ionized compounds with magnesium, reducing its free-ion concentration in the same way as it reduces the free-ion concentration of calcium. Any hardness due to magnesium is overcome in the same way as the calcium hardness, by addition of the requisite amount of sodium metaphosphate. Ordinarily, sodium metaphosphate is added until the particular water in question is shown to be soft by the soap test, indicating that the proper amount of sodium metaphosphate has been added to take care of all of the insoluble soap-forming metal ions.

I have found that the sodium pyrophosphate although exerting some influence in suppressing the calcium-ion concentration, is nevertheless relatively ineffective in softening calcium-containing waters compared with sodium metaphosphate. In order to get efficient softening of calcium-containing waters, I have found that sodium metaphosphate is required, as excessive amounts of sodium pyrophosphate would be necessary to get an equal degree of softening. Sodium pyrophosphate, however, has considerable softening effect so far as magnesium is concerned. Sodium pyrophosphate is somewhat alkaline. I prefer to use a relatively small amount, say, about 10% of sodium pyrophosphate in the sodium metaphosphate. The pyrophosphate not only neutralizes the acidity of the metaphosphate, but has some action in softening the water, particularly on the magnesium.

The amount of pyrophosphate or other acid-neutralizing reagent, such, for example, as sodium hydrate or sodium carbonate, may be regulated in accordance with the desired neutrality or alkalinity of the softened water. For the majority of purposes only enough acid-neutralizing reagent is added to the sodium metaphosphate to insure neutrality or very slight alkalinity, since for most purposes a neutral or very slightly alkaline softened water is desired.

I have found that as the alkalinity of the water is increased, the amount of sodium metaphosphate required for softening is increased. For example, a given water which required 1.7 pounds of sodium hexametaphosphate per 1000 gallons for softening against soap at a pH value of 8.5 required 2.9 pounds at a pH value of 10 for a like degree of softness. I therefore prefer to prevent excessive alkalinity not only because a neutral or but slightly alkaline water is best for most purposes, such as washing, but also because a neutral or but slightly alkaline water is more effectively and economically softened by my process than is a highly alkaline water.

While I prefer to use sodium metaphosphate, other alkali-metal metaphosphates may be used, such, for example, as potassium metaphosphate, lithium metaphosphate and ammonium metaphosphate. All of these metaphosphates are preferably used in the soluble form commonly known as hexametaphosphate.

The material may be sold as the metaphosphate mixed with a small amount of pyrophosphate or some alkaline substance, such as borax, sodium carbonate or trisodium phosphate, to neutralize the slight acidity of metaphosphate. However, the material may be sold in other combinations such as washing compound containing sodium metaphosphate and a soap. The relatively low alkalinity of such compounds permits the use of perfumes, which could not be used in the more highly alkaline washing preparations.

If desired, the sodium metaphosphate may be mixed with a substance which, when dissolved therewith, will act as a buffering agent to stabilize the water against too great acidity or too great alkalinity. For example, the sodium metaphosphate may be mixed with sodium bicarbonate, or mixed with sodium bicarbonate plus a small amount of sodium carbonate as in the sodium sesqui-carbonate, or mixed with disodium phosphate. These salts will have the well-known buffering action to stabilize the water against too great acidity or alkalinity.

While I do not know with certainty the exact chemical reactions occurring, I believe that the chemical reactions probably occur as I will now describe them. The following explanation is in accordance with the observed facts and is given as a theoretical discussion of what I believe occurs. It will be understood, therefore, that the invention is not limited to this theoretical explanation.

If a solution of sodium hexametaphosphate is slowly added to a hard water containing sufficient calcium, a white cloudy precipitate is first formed. I believe that this precipitate is calcium metaphosphate whose simplest formula might be expressed as $Ca(PO_3)_2$. To obtain calcium metaphosphate 2 formula weights of sodium metaphosphate ($NaPO_3$) are required to 1 formula weight of calcium (Ca). The experimental work on sodium hexametaphosphate indicates that it probably has the molecular formula ($Na_2(Na_4P_6O_{18})$). I believe that the calcium metaphosphate probably has a similarly constituted molecule expressed by the formula $Ca(Ca_2P_6O_{18})$. The calcium which is outside of the parenthesis in this formula probably ionizes in a degree similar to that characteristic of the salts composed of divalent metal and divalent radical.

At this point not only is there an objectionable precipitate, but complete softening has not been attained. In order to get effective softening, the sodium hexametaphosphate is required in excess of that to theoretically combine with the calcium to form calcium metaphosphate $Ca(PO_3)_2$. Upon the addition of sodium hexametaphosphate in excess of the theoretical combining formula weights, the precipitate is redissolved, and the water is softened as indicated by the soap test. For the re-solution of the precipitate, I believe that at least 1 additional formula weight of sodium metaphosphate should be used above that required to theoretically combine with the calcium as calcium metaphosphate. As this additional sodium metaphosphate is added, I believe that a combination is formed corresponding to the salt $Na_2(Ca_2P_6O_{18})$. This salt is probably ionized, yielding the sodium radical and a $Ca_2P_6O_{18}$ radical. The latter radical, in turn, is also probably ionized to a slight extent, yielding free calcium ions. The extent to which ionization of this radical occurs appears to be governed by the excess of sodium metaphosphate employed. The addition of sodium metaphosphate to supply 3 formula weights of sodium metaphosphate ($NaPO_3$) to 1 formula weight of calcium (Ca), softens the water to considerable extent, and apparently softens it against calcium carbonate, but not against soap. The addition of another formula weight of sodium metaphosphate to give 4 formula weights of sodium metaphosphate to 1 formula weight of calcium, was sufficient to soften a water containing 20 parts per million of calcium at a pH value of 8.5, but 7 formula weights of the sodium metaphosphate were required for this amount of calcium when the pH value was 10. My present experimental work indicates that 4 formula weights of sodium metaphosphate ($NaPO_3$) to 1 formula weight of calcium (Ca) is approximately the minimum which can be used for effective softening of water against soap.

The water softening action of the sodium metaphosphate is not that of throwing the calcium out of solution as an insoluble precipitate as is the case of the usual water softening compounds, but is rather to sequester or lock up the calcium in a but extremely slightly ionizable condition in a soluble sodium-calcium-metaphosphate complex molecule.

Magnesium probably forms a corresponding complex radical with the sodium hexametaphosphate, which, like the calcium-containing radical, has but a slight degree of ionization, which may be repressed by an excess of the sodium hexametaphosphate corresponding to the excess required to repress the ionization of the calcium.

The water softened in accordance with my process may be considered as a new product, in that it may be completely softened while at the same time containing in solution an amount of calcium which, if not held in a substantially un-ionized radical, would render the water hard. Ordinarily, if water contains in solution over about 5 parts per million of calcium, it is not considered to be completely soft as against a fatty acid soap, since it will consume some of the soap before a permanent lather is produced. By my process I can produce a water which will contain more than 5 parts per million of calcium in solution and which, at the same time, is completely softened as against a fatty acid soap.

The water which has been softened by the addition of the alkali-metal metaphosphate in accordance with my process, has certain further advantages, particularly for detergent and certain solvent purposes. It has greater detergent properties than a naturally soft water. The metaphosphate apparently imparts to the water a detergent or deflocculating action upon soil, which is the usual technical expression for dirt, grease and other substances to be removed. It increases the detergent action of even a soft water, so that it may be advantageously added to soft water for washing purposes.

The water to which the metaphosphate has been added can be advantageously used in places where it may not be desirable to employ a soapy water, such, for example, as in the washing of bottles, silverware, windows, automobiles, greasy metal parts, etc.

It can be advantageously employed for the "break" in laundering. In the usual commercial laundries the soiled clothes are put into the laundering wheel and are first subjected to a preliminary agitation or washing in cold or lukewarm water, usually made slightly alkaline with a small amount of an alkaline reagent, such as sodium carbonate or sodium metasilicate, and sometimes with the addition of a small amount of soap. This treatment is called the "break", and is employed to dislodge and remove the more readily removable soil prior to the softening of the fibers with the soap and hot water in the washing operation which immediately follows the break. In most commercial laundries either a naturally soft water or an artificially softened water, such as a zeolite softened water, is used for the break. It has been found that such a softened water picks up enough calcium from the clothes so that it frequently becomes quite hard at the end of the break when the water is drained off. The water which has been treated with an alkali-metal metaphosphate can be used in the break with a considerable advantage over the ordinary soft or softened waters. The metaphosphate treated water not only has inherent detergent properties, but also has solvent properties on the calcium. It not only tends more completely to dissolve out calcium compounds from the clothes and the soil than an ordinary softened water, but, because the dissolved calcium is locked up or sequestered in a but slightly ionized condition, the water will remain soft throughout the entire break.

At the end of the break the water is never completely removed from the clothes and the wet clothes remain in the wheel for the subsequent washing operation. The metaphosphate-treated water which remains in the clothes after the break is carried along into the next or soap-washing step and assists in effecting softening of the water for this step.

The calcium in the soiled clothes frequently exists in considerable part as calcium soap from previous launderings. By using the alkali-metal metaphosphate in the break, such calcium soap is dissolved in the break, and the clothes go to the washing operation freed from such calcium soap. Also, the metaphosphate exerts a solvent action on the soil which exists principally in the form of fine particles of dirt in the clothes.

The water to which the metaphosphate has been added can be advantageously used in de-liming processes because of the lime-solvent action of the metaphosphate. It is particularly useful where the properties of de-liming are required combined with a detergent action, as in the washing of hides and leather which have been treated with lime and from which it is desired to also remove dirt and grease. It not only increases the detergent action of a soft water, but renders it much more effective in dissolving substances like lime and calcareous compounds.

In the foregoing discussion I have spoken of the softening of water against soaps, with particular reference to the ordinary soaps which are usually of the fatty-acid type and which will combine with lime to form a curd-like calcium soap. There are certain recently developed soap of the sulphated alcohol type, known under various trade names such as "Gardinol", "Igepon", "Brilliant Avirol" and "Orvus", which will lather in hard water. They do not soften a hard water, and the water remains essentially hard during the washing operation and has a harsh "feel" even though a lather may be formed. I have found that water softened by my process may be used with advantage with the sulphated alcohol types of soap, as the water has an increased detergent effect and also probably renders the sulphated alcohol type of soap more effective by preventing its combination with the calcium. When a soap of this type is used, the water may not always be softened to the same degree as for use with the fatty-acid soaps.

While I have described a number of applications and the preferred embodiment of my invention, and have set forth what I believe to be the correct theoretical explanation of the chemistry involved, it is to be understood that the invention is not limited to such applications, or to its preferred embodiment or to my theoretical explanation, but that the invention may be otherwise embodied and practiced within the scope of the following claims.

I claim:

1. The process of softening water containing an alkaline-earth metal compound, which comprises adding thereto an alkali-metal metaphosphate which is water soluble and capable of sequestering calcium in a but slightly ionized condition in an amount sufficient to effectively suppress the soap-consuming alkaline-earth metal ion concentration.

2. The process of softening calcium-containing waters, which comprises adding thereto Graham's metaphosphate in an amount sufficient to effectively suppress the calcium-ion concentration.

3. The process of softening calcium-containing waters, which comprises adding thereto at least about 4 formula weights of sodium hexametaphosphate to 1 formula weight of calcium.

4. The process of softening calcium-containing waters, which comprises adding thereto an alkali-metal metaphosphate which is water soluble and capable of sequestering calcium in a but slightly ionized condition in an amount sufficient to reduce the calcium-ion concentration below that in equilibrium with the solid phase of its fatty acid soap.

5. The process of softening calcium-containing waters, which consists in adding thereto an alkali-metal hexametaphosphate in an amount sufficient to reduce the calcium-ion concentration below that in equilibrium with the solid phase of calcium carbonate.

6. The process of softening calcium-containing waters, which consists in adding thereto an alkali-metal hexametaphosphate in an amount sufficient to reduce the calcium-ion concentration below that in equilibrium with the solid phase of tricalcic phosphate.

7. The process of preventing deposits of calcium carbonate or calcium phosphate in feed lines of steam boilers, which comprises intermittently supplying through the feed line, water containing an alkali-metal metaphosphate which is water soluble and capable of sequestering calcium in a but slightly ionized condition in an amount sufficient to repress the calcium-ion concentration below that in equilibrium with the precipitate to be prevented.

8. The process of supplying water to steam boilers through feed-line equipment, which comprises passing through the feed-line equipment to the boiler, feed water which periodically contains sufficient sodium hexametaphosphate to prevent deposition of feed-line deposits, and between such periods supplying feed water untreated with phosphate.

9. The process of washing, which comprises adding to a hard water a sufficient amount to soften it of an alkali-metal metaphosphate which is water soluble and capable of sequestering calcium in a but slightly ionized condition, and washing the materials to be cleansed with the thus-softened water.

10. The process of washing, which comprises adding to a hard water a sufficient amount of alkali-metal hexametaphosphate to soften it, adding a soap to the water, and washing the materials to be cleansed with the water thus treated.

11. The process of washing, which comprises adding an alkali-metal metaphosphate which is water soluble and capable of sequestering calcium in but slightly ionized condition to water, and washing the materials to be cleansed with the water so treated.

12. The process of dissolving deposits of alkaline-earth metal compounds, which comprises subjecting them to the solvent action of water containing an alkali-metal metaphosphate which is water soluble and capable of sequestering calcium in a but slightly ionized condition.

13. The process of dissolving deposits of calcium soap, which comprises subjecting them to the solvent action of water containing an alkali-metal hexametaphosphate.

14. In the process of laundering fabrics, the step which consists in rinsing the fabrics with rinse water containing an alkali-metal metaphosphate which is water soluble and which exerts a solvent action upon alkaline-earth metal soaps which may have been deposited in the fabrics.

15. In the process of laundering clothes, the step which consists in subjecting the clothes in the break to water containing an alkali-metal hexametaphosphate.

16. As a washing compound, a mixture containing an alkali-metal hexametaphosphate and a soap.

17. As a water-softening compound, a mixture containing Graham's metaphosphate and a buffering salt to prevent too great acidity or alkalinity in the softened water.

18. As a new product, a water having more than 5 parts per million of calcium in solution, but which is completely softened against a fatty acid soap.

19. The process of washing, which comprises adding an alkali-metal metaphosphate which is water soluble and capable of sequestering calcium in a but slightly ionized condition and soap to water, and washing the materials to be cleansed with the water thus treated.

20. The process of softening water containing an alkaline-earth metal compound, which comprises adding thereto an alkali-metal hexametaphosphate in an amount sufficient to combine with the alkaline-earth metal and form a soluble slightly ionized complex therewith while maintaining the water free from excess alkalinity, whereby a soft clear water without excess alkalinity is secured.

21. As a new product, a soft water having more than 5 parts per million of calcium held in solution by metaphosphate and characterized by freedom from calcium precipitates and freedom from excess alkalinity.

22. The process of treating water containing an alkaline-earth metal compound, which comprises adding to the water alkali-metal metaphosphate which is water soluble and capable of sequestering calcium in a but slightly ionized condition in an amount sufficient to hold the alkaline-earth metal in a soluble slightly ionized metaphosphate complex.

23. The process of washing, which consists in washing the materials to be cleansed with water and sequestering the alkaline earth metal constituents of alkaline earth metal compounds present into water-soluble slightly ionized metaphosphate complexes while subjecting the materials to the action of a detergent, whereby alkaline earth metal compounds which may be present in the materials are removed therefrom and the washing is effected without the formation of solid alkaline earth metal-containing precipitates and is thereby facilitated.

24. A water softening preparation containing as an essential ingredient an alkali-metal metaphosphate which is water soluble and capable of sequestering calcium in a but slightly ionized condition.

25. A water softening compound containing effective amounts of an alkali-metal hexametaphosphate and an alkali-metal pyrophosphate.

26. A water softening compound containing effective amounts of an alkali-metal hexametaphosphate and a reagent for neutralizing the acidity of the metaphosphate.

27. A water softener which softens calcium-containing waters without precipitation or removal of the calcium, consisting principally of Graham's metaphosphate.

28. A washing composition comprising an alkali-metal metaphosphate which is water soluble and capable of sequestering calcium in a but slightly ionized condition and a deflocculative detergent capable of peptizing greases.

29. The process of washing, which comprises washing the material to be cleansed with water and sequestering the calcium of calcium compounds present into water soluble slightly ionized complexes while subjecting the material to the action of a detergent.

30. The process of washing, which comprises adding an alkali-metal hexametaphosphate to water, and washing the materials to be cleansed with the water so treated.

RALPH E. HALL.

Disclaimer

Re. No. 19,719.—*Ralph E. Hall*, Mount Lebanon, Pa. WATER SOFTENING AND WASHING. Patent dated Oct. 8, 1935. Disclaimer filed Sept. 10, 1948, by the assignee, *Hall Laboratories, Inc.*

Hereby enters this disclaimer of claims 1, 2, 3, 4, 5, 6, 16, 18, 20, 21, 22, 24, 25, 26, 27, and 28.

[*Official Gazette October 12, 1948.*]

adding an alkali-metal metaphosphate which is water soluble and capable of sequestering calcium in but slightly ionized condition to water, and washing the materials to be cleansed with the water so treated.

12. The process of dissolving deposits of alkaline-earth metal compounds, which comprises subjecting them to the solvent action of water containing an alkali-metal metaphosphate which is water soluble and capable of sequestering calcium in a but slightly ionized condition.

13. The process of dissolving deposits of calcium soap, which comprises subjecting them to the solvent action of water containing an alkali-metal hexametaphosphate.

14. In the process of laundering fabrics, the step which consists in rinsing the fabrics with rinse water containing an alkali-metal metaphosphate which is water soluble and which exerts a solvent action upon alkaline-earth metal soaps which may have been deposited in the fabrics.

15. In the process of laundering clothes, the step which consists in subjecting the clothes in the break to water containing an alkali-metal hexametaphosphate.

16. As a washing compound, a mixture containing an alkali-metal hexametaphosphate and a soap.

17. As a water-softening compound, a mixture containing Graham's metaphosphate and a buffering salt to prevent too great acidity or alkalinity in the softened water.

18. As a new product, a water having more than 5 parts per million of calcium in solution, but which is completely softened against a fatty acid soap.

19. The process of washing, which comprises adding an alkali-metal metaphosphate which is water soluble and capable of sequestering calcium in a but slightly ionized condition and soap to water, and washing the materials to be cleansed with the water thus treated.

20. The process of softening water containing an alkaline-earth metal compound, which comprises adding thereto an alkali-metal hexametaphosphate in an amount sufficient to combine with the alkaline-earth metal and form a soluble slightly ionized complex therewith while maintaining the water free from excess alkalinity, whereby a soft clear water without excess alkalinity is secured.

21. As a new product, a soft water having more than 5 parts per million of calcium held in solution by metaphosphate and characterized by freedom from calcium precipitates and freedom from excess alkalinity.

22. The process of treating water containing an alkaline-earth metal compound, which comprises adding to the water alkali-metal metaphosphate which is water soluble and capable of sequestering calcium in a but slightly ionized condition in an amount sufficient to hold the alkaline-earth metal in a soluble slightly ionized metaphosphate complex.

23. The process of washing, which consists in washing the materials to be cleansed with water and sequestering the alkaline earth metal constituents of alkaline earth metal compounds present into water-soluble slightly ionized metaphosphate complexes while subjecting the materials to the action of a detergent, whereby alkaline earth metal compounds which may be present in the materials are removed therefrom and the washing is effected without the formation of solid alkaline earth metal-containing precipitates and is thereby facilitated.

24. A water softening preparation containing as an essential ingredient an alkali-metal metaphosphate which is water soluble and capable of sequestering calcium in a but slightly ionized condition.

25. A water softening compound containing effective amounts of an alkali-metal hexametaphosphate and an alkali-metal pyrophosphate.

26. A water softening compound containing effective amounts of an alkali-metal hexametaphosphate and a reagent for neutralizing the acidity of the metaphosphate.

27. A water softener which softens calcium-containing waters without precipitation or removal of the calcium, consisting principally of Graham's metaphosphate.

28. A washing composition comprising an alkali-metal metaphosphate which is water soluble and capable of sequestering calcium in a but slightly ionized condition and a deflocculative detergent capable of peptizing greases.

29. The process of washing, which comprises washing the material to be cleansed with water and sequestering the calcium of calcium compounds present into water soluble slightly ionized complexes while subjecting the material to the action of a detergent.

30. The process of washing, which comprises adding an alkali-metal hexametaphosphate to water, and washing the materials to be cleansed with the water so treated.

RALPH E. HALL.

Disclaimer

Re. No. 19,719.—*Ralph E. Hall*, Mount Lebanon, Pa. WATER SOFTENING AND WASHING. Patent dated Oct. 8, 1935. Disclaimer filed Sept. 10, 1948, by the assignee, *Hall Laboratories, Inc.*

Hereby enters this disclaimer of claims 1, 2, 3, 4, 5, 6, 16, 18, 20, 21, 22, 24, 25, 26, 27, and 28.

[*Official Gazette October 12, 1948.*]